(No Model.)

A. M. LEINWATHER.
BALL CASTER.

No. 494,009. Patented Mar. 21, 1893.

Witnesses:
John C. Wilson
Percy C. Bowen

Inventor,
Aloys M. Leinwather,
By Whitman & Wilkinson
Attorneys.

UNITED STATES PATENT OFFICE.

ALOYS MARIE LEINWATHER, OF BASLE, SWITZERLAND.

BALL CASTER.

SPECIFICATION forming part of Letters Patent No. 494,009, dated March 21, 1893.

Application filed November 5, 1892. Serial No. 451,063. (No model.)

*To all whom it may concern:*

Be it known that I, ALOYS MARIE LEINWATHER, a subject of the Emperor of Austria-Hungary, and a resident of the city of Basle, in Switzerland, have invented certain new and useful Improvements in Ball Casters for Furniture, Machinery, and the Like, of which the following is a specification.

This invention relates to ball casters for furniture, machinery and the like and its object is to so construct such ball casters that the ball is free to move in any direction.

Figure 1:
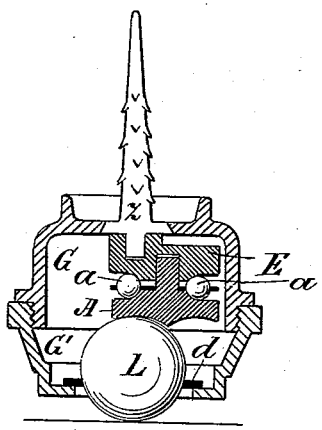
Figure 4:
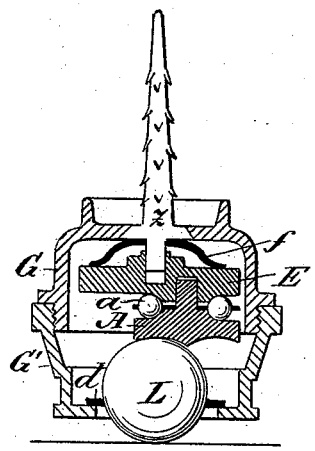
Figure 5:
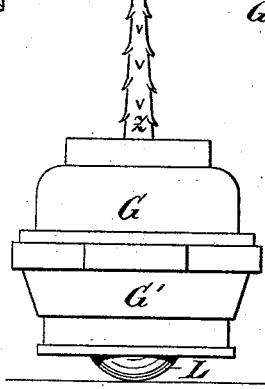
Figure 2:
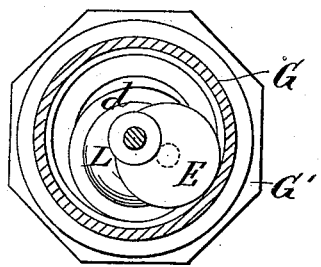
Figure 3:
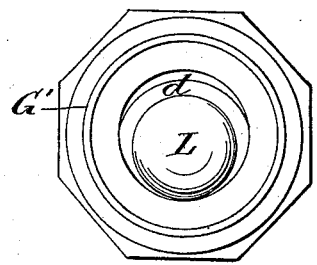

In the accompanying drawings Figure 1 is a central vertical section of my improved ball caster. Fig. 2 is a plan of the same, the upper part of the casing being removed. Fig. 3 is a bottom view of the same. Fig. 4 is a view similar to Fig. 1 showing a modification. Fig. 5 is a side elevation of Fig. 1.

This improved ball caster consists of a casing G the cover of which is provided with a central conical hole into which a nail or bolt Z is fitted securing the said casing to the leg of the article of furniture or machinery. The nail or bolt Z is eccentrically secured in a disk E Figs. 1 and 2 and into the central socket at the bottom of this disk fits the vertical journal pin of another disk A which bears against the running ball L. Antifriction balls *a* are interposed between the disks A and E. As the centers of the casing G, disk A and ball L are not in one line (Fig. 2) the ball can turn freely whatever may be the direction in which the article of furniture or the like has to be moved, and thereby turn the disk A around the axis of the ball caster until it is again normal to such direction of movement. The ball L is held by a ring *d* Figs. 1, 2 and 3 and the whole mechanism is covered by a casing G' screwed upon the casing G. The casing G' is provided with a hole at its bottom which allows for the necessary play of the running ball L; the latter is prevented from falling out by the ring *d*.

As is shown in Fig. 4 a spring *f* may be interposed between the shoulder on the nail or bolt Z and the disk E in order to make the caster elastic. In this case the disk E must be made larger.

Having thus described my invention, what I claim, and desire to secure by Letters Patent of the United States, is—

1. In a ball caster, the combination of a hollow casing formed in two detachable sections G and G', the upper section G having the shank Z, and the lower section G' having a hole in the center of its lower portion, of the disk E, the disk A, the balls *a* rotating between the said disks, and the running ball L rotating in said hole, and held in position by the ring *d*, all arranged and operating substantially as and for the purposes described.

2. In a ball caster, the combination of a hollow casing formed in two detachable sections G and G', the upper section G having the shank Z, and the lower section G' having a hole in the center of its lower portion, of the disk E, the spring *f* interposed between the disk E and the upper portion of the section G of the hollow casing, the disk A, the balls *a* rotating between the said disks E and A, and the running ball L rotating in said hole, and held in position by the ring *d*, all arranged and operating substantially as and for the purposes described.

In testimony whereof I have affixed my signature in presence of two witnesses.

ALOYS MARIE LEINWATHER.

Witnesses:
GEORGE GIFFORD,
E. GIRARD THELLUNG.